April 13, 1954
J. A. WILLIAMS
2,674,830
GAS PRESSURE CONTROLLING SYSTEM
Filed Nov. 4, 1949
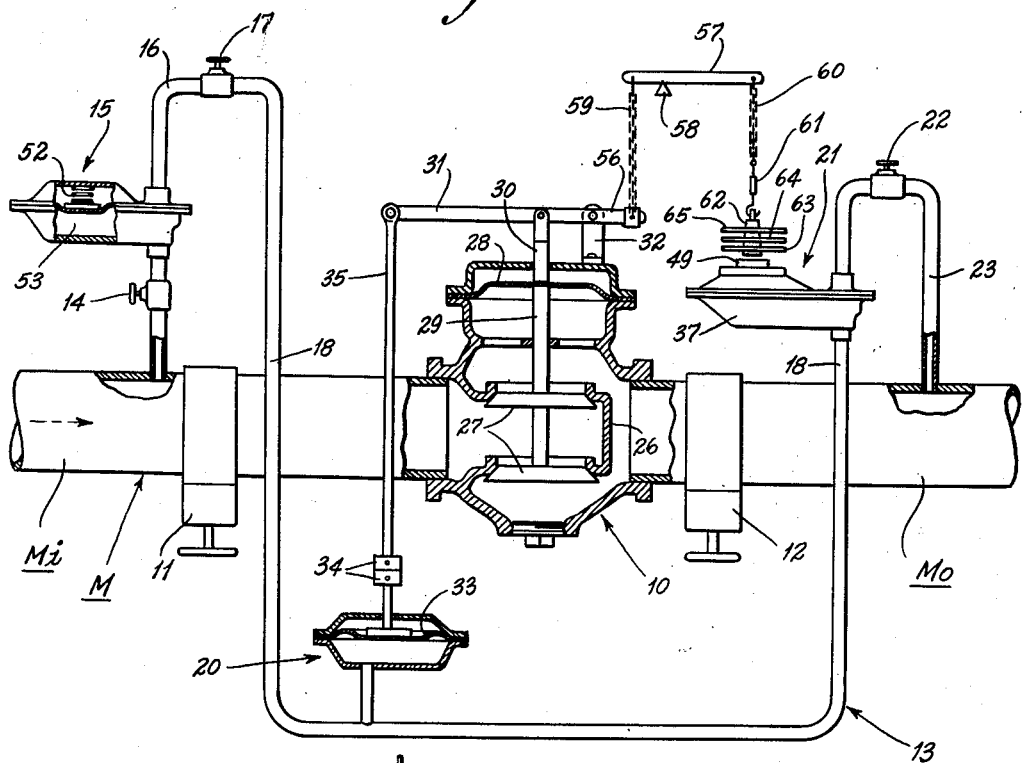
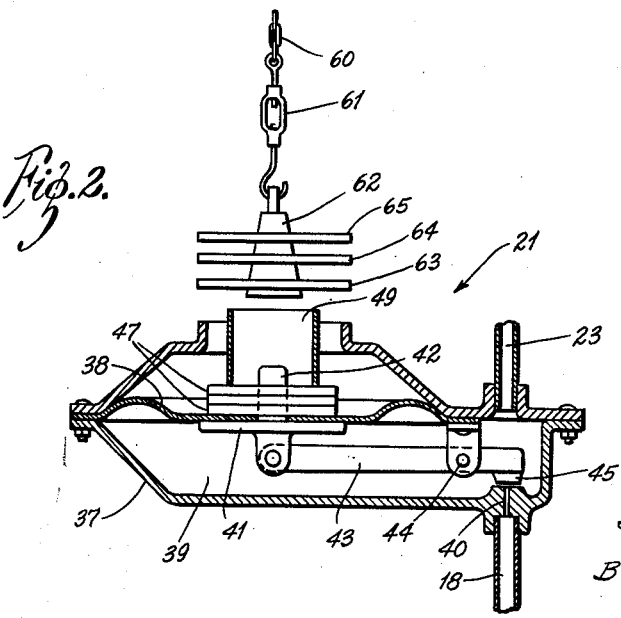
INVENTOR:
JOSEPH A. WILLIAMS,
BY Rogers & Ezell
ATTORNEYS.

Patented Apr. 13, 1954

2,674,830

UNITED STATES PATENT OFFICE 2,674,830

GAS PRESSURE CONTROLLING SYSTEM

Joseph A. Williams, St. Louis, Mo.

Application November 4, 1949, Serial No. 125,492

5 Claims. (Cl. 50—17)

This invention relates to an apparatus that may be used in connection with regulating pressures of gas in a gas line, and especially in connection with the maintenance of certain working pressures in municipal gas systems. In modern heating and cooking gas systems that are made up of networks of gas mains supplied from one or more central gas supply stations, it is usual to have a relatively high pressure delivered from the stations and to reduce that pressure at substations or at the points of use to considerably lower values appropriate to the consuming appliances.

Ordinary city-wide gas systems, such as those used for heating and cooking, are subject to an extensive variation in demand. Typically, for instance, the demand rises early each morning when heating and cooking equipment start into use. Depending upon the condition of the weather, this load may drop off substantially during the late morning period, and may rise again as dinner cooking and afternoon heating become necessary. Another obvious point of variation in gas consumption arises from the variation in temperature and hence variation in the heating load required from the system.

Conventional gas pressure regulating systems that are used at sub-stations or the like reduce the main pressure from some value that is relatively high, as for example 12 or 15 p. s. i., to some relatively low value, such as 6 inches of water. These conventional regulators will maintain the outlet pressure substantially constant regardless of variations in load. Yet, where the load increases on the outlet side of the regulators as by increased demand for gas, the outlet side pressure, it has been found, should be increased proportionately to the increase in load if proper operation of the gas appliances is to be expected. Furthermore, when the load is low, it is desirable to maintain the minimum pressure necessary to provide proper operation of the gas equipment, as the loss factors in gas supply and main operations increase with increased pressure.

The object of the present invention is to provide a gas pressure regulator in which the outlet pressure is maintained within a limit of pressure values that increase proportionately to increased load demand on the gas main. Stated differently, as the consumption of gas from the main increases, the present equipment automatically increases the pressure in the main proportionately to the variation in demand.

More specifically, it is an object of the invention to provide a pressure regulator system including a pressure regulator device that is properly loaded to maintain a predetermined extreme pressure in the main, and which is additionally loaded as the consumption of gas from the main increases proportionately to such increase in consumption. Particularly, it is an object of the invention to provide a weighting system to increase the load on the pressure regulator proportionately to the increase in consumption.

A further object of the invention is to incorporate such a regulating system into the type of pressure regulating apparatus that provides both a primary and an auxiliary gas line that deliver gas from a high pressure side of a main to a low pressure side thereof, the present equipment intervening between the two sides and determining the pressure on the outlet side.

Other objects will appear from the description to follow.

In the drawings:

Fig. 1 is a diagrammatic view partly in section, of a gas main system incorporating the equipment of the present invention; and Fig. 2 is a sectional view of one of the auxiliary pressure regulators, appearing toward the right-hand side of Fig. 1.

Referring to the drawings, a main gas line M is shown as passing from left to right through a main gas pressure regulator 10. The high pressure inlet side of this main is indicated at $Mi$ and the low pressure outlet at $Mo$. For convenience of servicing, a manual valve 11 is located at the inlet side of the main regulator 10, and a similar valve 12 is at the outlet side.

An auxiliary line having the over-all reference number 13 leads from the inlet side $Mi$ of the main, ahead of the valve 11, through a cut-off valve 14 and then into a first auxiliary regulator 15. A portion 16 of the line 13 leads from the outlet of this regulator 15 to a throttling valve 17, such as a needle valve. An additional portion 18 of the line 13 continues from the valve 17, branching into a pressure motor 20, and also leading to a second auxiliary pressure regulator 21. A cut-off valve 22 is disposed in the outlet line 23 of the second auxiliary regulator 21, from which a portion 23 of the auxiliary pipe 13 continues to the outlet $Mo$ of the main.

The main pressure regulator is of familiar design. It has a partition means 26 having opposite ports therein that are regulated by a balanced valve 27. This balanced valve is connected to a flexible diaphragm 28, by a stem 29. The diaphragm 28 is open on its lower side to the outlet side of the main regulator valve 10, and on its upper side it is open to atmosphere. Another connecting rod 30 (or a continuation of the rod 29) extends upwardly through the top of the housing of the main regulator 10, and is pivotally connected to a lever 31 that is pivotally mounted at 32 onto the top housing. The lever 31 is connected by a thrust rod 35 to the diaphragm 33 of the power motor 20, the lower surface of which forms a movable wall for the pressure chamber of the motor 20. Suitably adjustable weights 34 are provided on the rod 35 so that the force acting downwardly on the diaphragm 33 may be adjusted.

The two auxiliary regulators are shown diagrammatically in Figure 1, and the second auxiliary regulator 21 is shown in section in Figure 2. The regulator 21 includes a lower pressure chamber 39 in a lower housing member 37, the top of which is formed in part by a flexible diaphragm 38. The connecting pipe 18 leads through a constriction inlet 40 entering the pressure chamber 39 formed as aforesaid. The pipe 23 that is connected to the outlet main Mo leads from the chamber 39.

The diaphragm operates a valve. To this end, there is a buffer disc 41 disposed below the diaphragm and connected to a pin 42 that extends through the diaphragm but is sealed therewith so as to prevent escape of gas from the chamber 39 at this point. The buffer disc 41 has a depending lug that pivotally receives one end of a valve lever 43. The other end of this valve lever is pivoted at 44 to the housing, and the extreme end of the lever 43 supports a valve 45 that is adapted to cooperate with the constriction 40 previously mentioned, to regulate flow therethrough.

As it is evident that the diaphragm and hence the valve are located by pressure in the outlet line 23, a predetermined loading force is supplied to the diaphragm opposing pressure in the chamber 39. In the preferred arrangement for the second regulator 21, this may consist of a plurality of primary weights 47 that are mounted around the pin 42 and over which there is a cylinder 49. The cylinder 49 projects above an opening in the upper housing of the regulator, even when the diaphragm is in its lowest position. This cylinder is adapted to receive additional loading means, as will appear.

The first regulator 15 is of similar construction, except that its diaphragm is loaded by a spring 52 so that the pressure in its lower chamber 53 is a function of the force of the spring 52. This spring may be adjustable as is known in the art.

In the present construction, means are provided to vary the force acting downwardly on the diaphragm 38 of the second regulator 21 in accordance with the positioning of the valve 27 of the main regulator 10. For this purpose, the lever 31 has an extension 56 projecting to the right of the pivot mounting 32. A lever 57, operable over a fulcrum 58 that may be adjusted in the known manner, is connected by a chain 59 to the end 56 of the lever 31. The other end of the lever 57 is connected to a chain 60. This chain 60, having an interposed, adjustable turnbuckle 61, is, in turn, a support for a cone 62 that has on it a plurality of weights 63, 64 and 65, these weights being supplied in numbers and of sizes suitable for the operation of the apparatus. The discs 63, 64 and 65 have holes in them which cause them to be supported in spaced relationship when the cone 62 is elevated. In a preferred construction, the discs are about one-sixteenth inch apart when the cone 62 is elevated. As the cone is lowered, the weights successively rest upon the cylinder 49 that is supported by the diaphragm 38. In other words, with the initial stage of lowering of the chain 60 and the cone 62, the lowest weight 63 will be deposited onto the cylinder 49. A slight additional lowering of the cone will add the weight 64 to the cylinder, and a further additional lowering of the cone will add the weight 65. When the cone 62 is raised, it will remove the discs successively, beginning with the disc 65.

The operation of the apparatus is as follows:

In describing the operation of this apparatus, reference will be made to certain dimensions and pressure values which, it will be understood, are merely given to illustrate the operation and not to limit the disclosure. It will be quite evident that the apparatus can be used with appropriate adjustments to accommodate other pressure values, and with other dimensions proper to accommodate such conditions.

At the start, it will be assumed that the pressure in the main inlet Mi is in the order of 15 p. s. i., but may vary such, for example, as from 2 to 30 p. s. i. It will also be assumed that the desired operating load pressure in the outlet Mo is approximately six inches of water, although the outlet side pressure may be higher in winter when there is a heavy heating load. For example, a typical gas company operation may maintain about six inches in the outlet during the summer and about seven inches or even more in the winter. It will also be found that with a main valve 27 that can move approximately an inch and a half between its fully closed and fully open position, and with a second auxiliary regulator movable about three-quarters of an inch between fully closed and fully open positions, the distance from the pivot 32 on the lever 31 to the chain connection 59 with the lever 57 should be about eighteen inches. A connection has been shown to exemplify the adjustment of this distance. The chain is shown as being connected by a sliding connector to the lever projection 56, and similar connections can be used at the other parts of the leverage system. Also, the fulcrum 58 is adjustable. A desired leverage ratio for the lever 57 is one to eight, and a satisfactory operating length for the lever 57 has been found to be about thirty-six inches.

It may be assumed at the start thus that the inlet pressure at Mi is about 18 p. s. i. It will also be assumed at the start that there is no load on the outlet side Mo under such conditions. The pressure in the outlet Mo and in the connecting line 23 will build up slightly above the maintained pressure, and acting in the pressure chamber 39 will lift the diaphragm 38, its fixed weights 47, and the cylinder 49, so as to close the valve 45, thus closing the auxiliary line 13.

The inlet pressure, however, is entering the line 13 past the first auxiliary regulator 15 and the throttling valve 17. The auxiliary regulator 15 is designed to establish a certain intermediate working pressure in the line 16, as for example ten inches. The throttling valve 17 holds the flow of gas in the auxiliary line 13 to some low amount such as 15 to 20 cubic feet per hour. With this combination, the relatively small changes in pressure subsequent to the throttling valve 17 will have no great effect upon the position of the valve of the auxiliary regulator 15. This auxiliary regulator, therefore, will function to maintain its own outlet pressure, and, with the second auxiliary regulator 21 closed, it will cycle around a substantially closed and closed position sufficiently to overcome pressure losses and to maintain what is called a locking pressure in the line 13. This locking pressure will be higher but not greatly higher than the working pressure in the line. For example, a locking pressure of about fourteen inches is conventionally found in this type of regulator.

With such a locking pressure maintained in the portion 18 of the line 13, the pressure chamber of the pressure motor 20 will be expanded, elevating the diaphragm 33 against the weights 34, and, through the leverage system, closing entirely the valves 27 of the main regulator 10.

When the valves 27 are closed, because the lever 31 is in a clockwise extreme position, the end 56 of the lever 31 will be down. This is accompanied by a tension upon the chain 59, rocking the secondary lever 57 and elevating the cone 62 and the weights thereon until they occupy positions spaced above the cylinder 49, and thereby do not influence the position of the diaphragm 38 of the secondary regulator 21. That regulator thereby responds to the outlet side pressure and is fully closed by the building up of that pressure when all of the consuming outlets are closed off. As soon as such outlet pressure reaches the maximum previously mentioned, the secondary pressure regulator will cut off, and thereafter may operate only sufficiently to maintain such a maximum.

When one or more consuming outlets are opened, there will be an early drop in pressure in the outlet end Mo. This will be followed by a lowering of the diaphragm 38 of the secondary pressure regulator 21, and an opening of the valve 45. For the supply to a relatively small number of consuming outlets, the auxiliary flow through the line 13 may be enough to maintain pressure at the desired working maximum in the outlet line Mo. Consequently, the secondary pressure regulator 21 may be able to maintain sufficient regulation of pressure and supply of gas at low consumption levels.

The passage of gas through the secondary auxiliary regulator 21 may be accompanied by a lowering of pressure in the line 13. However, the pressure must reduce to a value of approximately ten inches, for example, before the motor 20 will lower its diaphragm 33 and begin the opening of the main valves 27 of the primary pressure regulator 18. If the auxiliary line 13 becomes inadequate to supply the pressure required for the consumer's demand, the working pressure in the line 13 will drop somewhat below the ten-inch figure. This will be accompanied by a lowering of the diaphragm 33 in proportionate amount and the initial opening of the main valves 27. As these valves are very large, they may open only a slight distance to supply a substantial amount of gas to the outlet Mo, which will be accompanied by a rise in pressure in the outlet. Such a rise in outlet pressure will react upon the secondary auxiliary regulator, tending to throttle its valve and again raise the pressure in the motor 20 to tend to throttle the main valves 27. An equilibrium will be established at which the valve combinations supply the proper outlet side pressure, suitable to the initial demand.

As the demand increases, the intermediate pressure in the line 13 will be further reduced, which will be accompanied by a further lowering of the diaphragm 33 and further opening of the valves 27 to maintain the desired outlet pressure. It has already been noted that, as the consumption increases, it is desirable to increase the outlet pressure. With the present apparatus, an increased opening of the valves 27 is accompanied by a successively increasing clockwise movement of the secondary lever 57. Such clockwise movement causes the cone 62 to move to the cylinder 49 mounted upon the diaphragm 38 of this secondary regulator 21. After a predetermined amount of such movement, which may be adjusted to produce the result at any position, the first weight 63 will be deposited on top of the cylinder 49. When this occurs, the diaphragm 38 is given an additional load, determined by the mass of the disc 63. Such additional load on the diaphragm 38 tends to increase the opening of the valve 45 so that the outlet pressure in the line 23 is increased, and the pressure in the diaphragm chamber 39 is also increased until equilibrium is obtained. This additional opening of the valve 45 further lowers the working pressure in the intermediate pressure 18 of the auxiliary line 13, and therefore further decreases the pressure in the motor 20, so that the main valves are additionally opened in response to the deposit of the weight 63 on the second auxiliary pressure regulator 21. Thus the main valves 27 are opened a slight additional amount, increasing the outlet pressure Mo. The significance of this is that the increase in demand for gas is accompanied by an increase in the pressure of the gas delivered.

Upon a greater demand for gas from the outlet Mo, there will be a further reduction in the intermediate pressure in the line 13, a further opening of the main valve, and the deposit of additional discs 64 and 65 successively to the diaphragm 38. In consequence, there will be a proportional increase in the outlet pressure in response to an increase in demand for gas in the outlet Mo. This was the primary objective set forth for the apparatus. In the embodiment shown, it is obtained by the cone and disc mechanism that successively deposits additional weights upon the second auxiliary regulator as the main valve 27 opens. As the main valve 27 responds to demand, the weights 63—65 are thus successively deposited in response to increased opening of the main valve, which, in turn, is in response to increased consuming demand for gas.

The position of the main valve at which the first deposit of the weight 63 to the auxiliary pressure regulator occurs may be adjusted by adjusting the turnbuckle 61. The rate at which additional weights are deposited upon the pressure regulator diaphragm 38 occurs with respect to the rate of opening of the main valves may be adjusted by adjusting the leverage system between the main valve and the cone 62. For example, an adjustment may be obtained by changing the position of the fulcrum 58 or of the position of the change with respect to their levers. The sensitivity of the equipment may be adjusted by the design or the slope of the cone 62 and the numbers of auxiliary weights that are mounted thereon. As has already been stated, it has been found that for ordinary purposes the weights may be approximately one-sixteenth inch apart when the cone is elevated. Needless to say, they are mounted one upon the other when the cone is lowered into its released position with the weights deposited upon the cylinder 49.

In its particular sense, this invention involves the regulation of a main valve by an intermediate pressure that is determined, in turn, by a pressure regulator, combined with an adjustment of the load on the pressure regulator in accordance with the change in position of the main valve.

In another sense, the invention involves the regulation of the outlet pressure in the auxiliary main portion 23 as a function of demand, for this secondary regulator 21 is positioned as a function of the position of the power motor diaphragm 33. As a matter of fact, the equipment may be adjusted to deposit weights on the diaphragm of the auxiliary regulator prior to opening of the main valves 27, which illustrates the point that the invention includes regulation of outlet pressures with the single regulator 21, as well as regulation by the combination of main and auxiliary regulators.

What is claimed is:

1. In a gas pressure regulator apparatus: a main gas valve device having an inlet and an outlet and a main valve movable to regulate flow therethrough; a high pressure regulator having its inlet connected with the main valve inlet; a low pressure regulator having its outlet connected with the main valve outlet, the low pressure regulator having a movable wall subjected to its outlet pressure and a valve operated thereby to regulate flow through the regulator to operate the valve toward open position in response to fall of outlet pressure and toward closed position in response to rise thereof; piping connecting the outlet of the high pressure regulator to the inlet of the low pressure regulator; throttling means in the piping to cause the intermediate pressures between the throttling means and the low pressure regulator to be capable of being varied without substantial variation of the pressures in the outlet of the high pressure regulator; a pressure motor having a movable wall operated by the intermediate pressures; leverage connecting the pressure motor with the main gas valve to apply a closing force on the main valve that increases with increase of intermediate pressure and vice versa; a plurality of weights; weight supporting means to support the weights at different, spaced, elevations above the movable wall of the low pressure regulator, the supporting means being movable toward and from the movable wall to deposit the weights successively onto the wall at successive, different elevations of the supporting means, and to withdraw them similarly in reverse order; means connecting the weight supporting means with the leverage between the pressure motor and main valve so that the weight supporting means moves downwardly to deposit weights as the intermediate pressure successively decreases below predetermined values, the space between the first weight and the movable wall, and the spaces between the successive weights, providing ranges of operation of the low pressure regulator wherein the regulator may maintain pressure corresponding to the particular weight load on it at the time.

2. The combination of claim 1, wherein the weight supporting means includes a cone and the weights have successively larger holes so that they may rest on the cone at successive elevations thereon.

3. The combination of claim 1, wherein the weight supporting means includes a flexible connector and a weight holding member, the connector suspending the member over the movable wall.

4. The combination of claim 3, wherein there is also a lever from which the connector is suspended; and means connecting the lever and the previously recited leverage.

5. The combination of claim 3, with means to adjust the effective length of the flexible connector to preset the position of the leverage at which the weights will be deposited onto the movable wall.

References Cited in the file of this patent

UNITED STATES PATENTS

| Number | Name | Date |
|---|---|---|
| 341,295 | Westinghouse | May 4, 1886 |
| 539,205 | Van Wie | May 14, 1895 |
| 559,894 | House | May 12, 1896 |
| 1,474,192 | Gessler | Nov. 13, 1923 |
| 1,732,012 | Groble | Oct. 15, 1929 |
| 1,809,930 | Ford | June 16, 1931 |
| 2,044,646 | Stein | June 16, 1936 |
| 2,071,871 | Cleveland | Feb. 23, 1937 |
| 2,182,873 | King | Dec. 12, 1939 |
| 2,486,899 | Williams | Nov. 1, 1949 |

FOREIGN PATENTS

| Number | Country | Date |
|---|---|---|
| 548,839 | Great Britain | Oct. 27, 1942 |